(12) United States Patent
Johnson et al.

(10) Patent No.: US 11,165,250 B2
(45) Date of Patent: Nov. 2, 2021

(54) ELECTRICAL ENERGY SAVING SYSTEM

(71) Applicant: Innovative Energy Solutions & Services, Inc., Cedar Hill, TN (US)

(72) Inventors: Jerry B. Johnson, Prairie View, TN (US); Andrew B. Johnson, Cedar Hill, TN (US)

(73) Assignee: Innovative Energy Solutions & Services, Inc., Cedar Hill, TN (US)

( * ) Notice: Subject to any disclaimer, the term of this patent is extended or adjusted under 35 U.S.C. 154(b) by 92 days.

(21) Appl. No.: 16/434,449

(22) Filed: Jun. 7, 2019

(65) Prior Publication Data

US 2020/0389015 A1 Dec. 10, 2020

(51) Int. Cl.
| | | |
|---|---|---|
| *H02H 3/18* | (2006.01) | |
| *H02H 3/22* | (2006.01) | |
| *H02H 1/00* | (2006.01) | |
| *H02H 1/04* | (2006.01) | |
| *H02H 9/06* | (2006.01) | |

(52) U.S. Cl.
CPC ............... *H02H 9/06* (2013.01); *H02H 1/04* (2013.01)

(58) Field of Classification Search
CPC .. H02H 9/06; H02H 3/22; H02H 3/18; H02H 9/04; H02H 9/041
See application file for complete search history.

(56) References Cited

U.S. PATENT DOCUMENTS

| | | | | | |
|---|---|---|---|---|---|
| 3,546,572 | A | * | 12/1970 | Specht | G05F 3/18 361/111 |
| 4,152,743 | A | * | 5/1979 | Comstock | H02H 9/042 361/111 |
| 4,271,446 | A | * | 6/1981 | Comstock | H02H 9/042 340/638 |
| 4,410,807 | A | * | 10/1983 | Buffington | H02J 9/06 307/68 |
| 4,760,485 | A | * | 7/1988 | Ari | H02H 9/005 361/54 |
| 4,922,366 | A | * | 5/1990 | Van Dick | H01H 85/44 337/290 |
| 5,136,460 | A | * | 8/1992 | Misencik | H02H 9/044 361/117 |
| 5,157,572 | A | * | 10/1992 | Bird | H02H 9/06 361/111 |

(Continued)

OTHER PUBLICATIONS

International Search Report and Written Opinion for PCT Appln. No. PCT/US20/36231; dated Sep. 9, 2020 and all references cited therein.

*Primary Examiner* — Sisay G Tiku
(74) *Attorney, Agent, or Firm* — Hovey Williams LLP

(57) ABSTRACT

A system for conditioning electric power supplied from a three-phase alternating current electric power supply, including three phase lines, to a load, including the phase lines and an electric ground line, includes a plurality of first surge arresters, a plurality of second surge arresters, a plurality of third surge arresters, a three-phase surge suppressor, and a plurality of capacitors. The surge arresters minimize the amount by which the voltage between two phases and the ground line exceeds a rated value. The three-phase surge suppressor minimizes the amount by which the voltage between any of the three phases and the ground line exceeds a rated value. The capacitors minimize the amount by which the voltage between two phases falls below a rated value.

15 Claims, 1 Drawing Sheet

(56) References Cited

U.S. PATENT DOCUMENTS

| | | | | |
|---|---|---|---|---|
| 5,412,526 A * | 5/1995 | Kapp | ...................... | H02H 3/046 360/111 |
| 5,654,857 A * | 8/1997 | Gershen | .................. | H02H 3/33 361/118 |
| 6,034,611 A * | 3/2000 | Brooks | ................. | G01R 31/50 340/647 |
| 6,055,147 A * | 4/2000 | Jeffries | .................... | H01C 7/13 361/103 |
| 6,088,209 A * | 7/2000 | Sink | ........................ | H02H 3/33 361/118 |
| 6,477,025 B1 * | 11/2002 | Goldbach | .............. | H02H 9/042 337/159 |
| 8,223,468 B2 * | 7/2012 | Januszewski | .......... | H02H 9/005 361/111 |
| 8,971,007 B2 * | 3/2015 | Johnson | .................. | H02H 9/04 361/118 |
| 9,025,297 B2 * | 5/2015 | Fujisawa | ................ | H02H 9/042 361/111 |
| 9,812,858 B2 * | 11/2017 | Kawabata | ................ | H01C 7/12 |
| 9,882,373 B2 * | 1/2018 | Lindell | .................... | H02H 9/04 |
| 10,633,114 B2 * | 4/2020 | Momoh | ................. | G08G 5/025 |
| 2016/0126728 A1 * | 5/2016 | Kawabata | ................ | H01C 7/12 361/56 |

\* cited by examiner

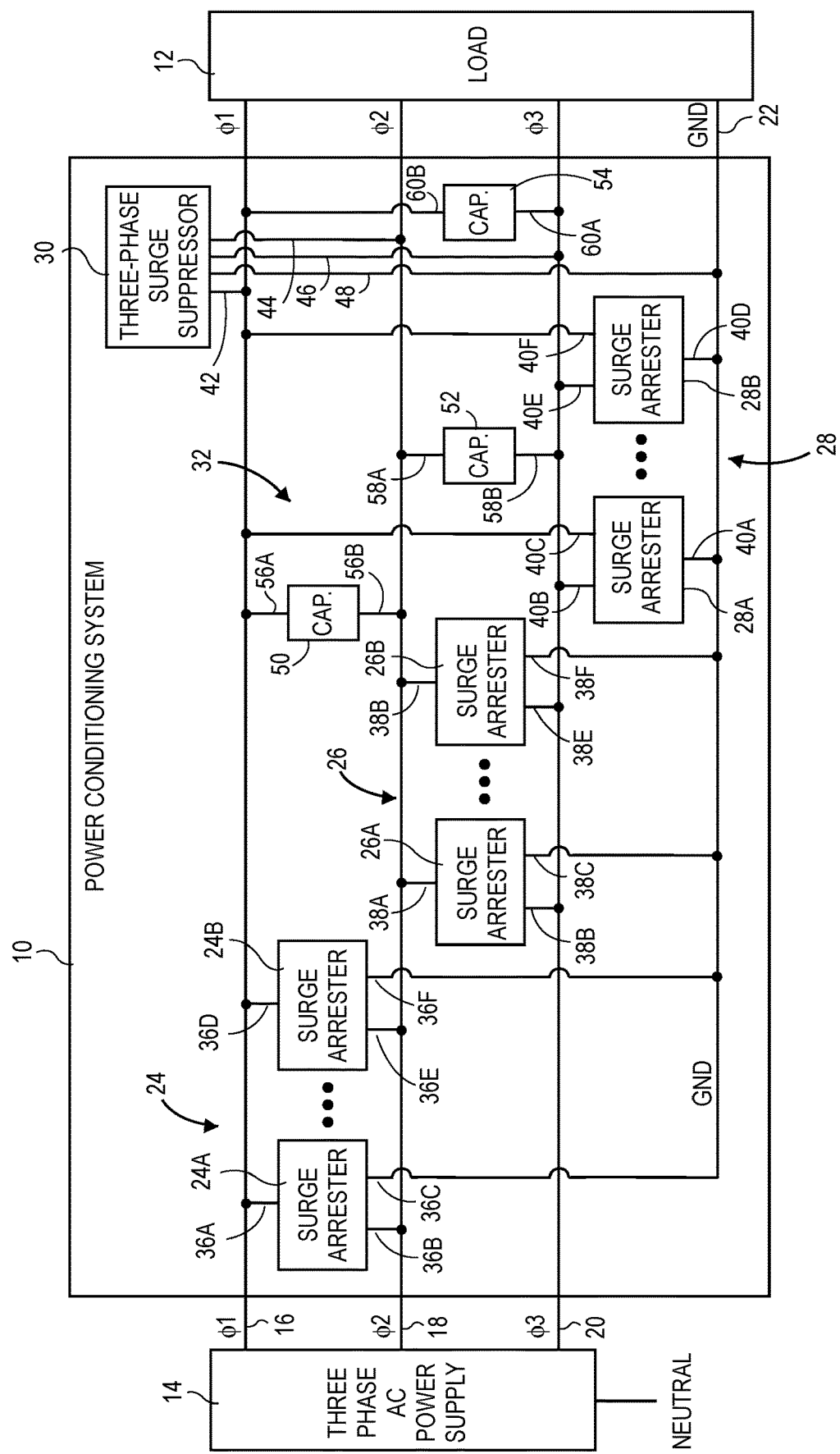

ELECTRICAL ENERGY SAVING SYSTEM

BACKGROUND OF THE INVENTION

Field of the Invention

Embodiments of the present invention relate to methods and systems for supplying alternating current (AC) electric power to a load. More particularly, embodiments of the present invention relate to methods and systems that condition the power supplied to a load from an AC electric power supply in order to save electrical energy.

Description of the Related Art

AC electric power supplied from a utility company may include transient spikes or surges in the line voltage, wherein the voltage level is greater than it should be, as a result of lightning or electrical storm activity or various other phenomena. In addition, the line voltage may experience droops or sags, wherein the voltage level is less than it should be, as a result of increased loading of the power supply. These variations in the level of the voltage supplied to a load may lead to additional wear on devices connected to the power supply and increased electrical energy consumed in the form of additional heat produced in the electrical system wiring and additional start-up current load.

SUMMARY OF THE INVENTION

Embodiments of the present invention solve the above-mentioned problems and provide a distinct advance in the art of supplying alternating current (AC) electric power to a load. More particularly, embodiments of the invention provide methods and systems that condition the power supplied to a load from an AC electric power supply in order to save electrical energy.

One embodiment of the current invention provides a system for conditioning electric power supplied from a three-phase alternating current (AC) electric power supply to a load, the power supply including a first phase line, a second phase line, and a third phase line, and the load including the first phase line, the second phase line, the third phase line, and an electric ground line. The system broadly comprises a plurality of first surge arresters, a plurality of second surge arresters, a plurality of third surge arresters, a three-phase surge suppressor, and a plurality of capacitors. The first surge arresters are configured to minimize an amount by which the voltage between two phase lines and the ground line exceeds a rated value. Each first surge arrester is coupled to the first phase line, the second phase line, and the ground line. The second surge arresters are configured to minimize an amount by which the voltage between two phase lines and the ground line exceeds the rated value. Each second surge arrester is coupled to the second phase line, the third phase line, and the ground line. The third surge arresters are configured to minimize an amount by which the voltage between two phase lines and the ground line exceeds the rated value. Each third surge arrester is coupled to the first phase line, the third phase line, and the ground line. The three phase surge suppressor is configured to minimize an amount by which the voltage between any of the three phase lines and the ground line exceeds the rated value. The surge suppressor is coupled to the first phase line, the second phase line, the third phase line, and the ground line. The capacitors are configured to minimize an amount by which the voltage between two phase lines falls below the rated value. The capacitors include a first capacitor coupled to the first phase line and the second phase line, a second capacitor coupled to the second phase line and the third phase line, and a third capacitor coupled to the first phase line and the third phase line.

Another embodiment of the current invention provides a system for conditioning electric power supplied from a three-phase alternating current (AC) electric power supply to a load, the power supply including a first phase line, a second phase line, and a third phase line, and the load including the first phase line, the second phase line, the third phase line, and an electric ground line. The system broadly comprises a plurality of first surge arresters, a plurality of second surge arresters, a plurality of third surge arresters, a three-phase surge suppressor, and a plurality of capacitors. The first surge arresters are coupled to the first phase line, the second phase line, and the ground line and may minimize the amount by which the voltage between two phase lines and the ground line exceeds a rated value by presenting a low impedance to the ground line when either the first phase line or the second phase line exceeds the rated value. The second surge arresters are coupled to the second phase line, the third phase line, and the ground line and may minimize the amount by which the voltage between two phase lines and the ground line exceeds the rated value by presenting the low impedance to the ground line when either the second phase line or the third phase line exceeds the rated value. The third surge arresters are coupled to the first phase line, the third phase line, and the ground line and may minimize the amount by which the voltage between two phase lines and the ground line exceeds the rated value by presenting the low impedance to the ground line when either the third phase line or the first phase line exceeds the rated value. The three phase surge suppressor is coupled to the first phase line, the second phase line, the third phase line, and the ground line and may minimize the amount by which the voltage between the three phase lines and the ground line exceeds the rated value by presenting the low impedance to the ground line when either the first phase line, the second phase line, or the third phase line exceeds the rated value. The capacitors include a first capacitor coupled to the first phase line and the second phase line, a second capacitor coupled to the second phase line and the third phase line, and a third capacitor coupled to the first phase line and the third phase line. The capacitors may minimize the amount by which the voltage between two phase lines falls below the rated value.

Still another embodiment of the current invention provides a system for conditioning electric power supplied from a three-phase alternating current (AC) electric power supply to a load, the power supply including a first phase line, a second phase line, and a third phase line, and the load including the first phase line, the second phase line, the third phase line, and an electric ground line. The system broadly comprises a plurality of first surge arresters, a plurality of second surge arresters, a plurality of third surge arresters, a three-phase surge suppressor, and a plurality of capacitors. The first surge arresters are coupled to the first phase line, the second phase line, and the ground line and may minimize the amount by which the voltage between two phase lines and the ground line exceeds a rated value by presenting a low impedance to the ground line when either the first phase line or the second phase line exceeds the rated value. Each of the first surge arresters includes a first electric current rating, such that the number of first surge arresters is related to the electric current requirement of the load divided by the first electric current rating. The second surge arresters are coupled to the second phase line, the third phase line, and the ground line and may minimize the amount by which the voltage between two phase lines and the ground line exceeds the rated value by presenting the low impedance to the ground line when either the second phase line or the third phase line exceeds the rated value. Each of the second surge arresters includes a second electric current rating, such that the number of second surge arresters is related to the electric current requirement of the load divided by the second electric current rating. The third surge arresters are coupled to the first phase line, the third phase line, and the ground line and may minimize the amount by which the voltage between two phase lines and the ground line exceeds the rated value by presenting the low impedance to the ground line when either the third phase line or the first phase line exceeds the rated value. Each of the third surge arresters includes a third electric current rating, such that the number of third surge arresters is related to the electric current requirement of the load divided by the third electric current rating. The three phase surge suppressor is coupled to the first phase line, the second phase line, the third phase line, and the ground line and may minimize the amount by which the voltage between the three phase lines and the ground line exceeds the rated value by presenting the low impedance to the ground line when either the first phase line, the second phase line, or the third phase line exceeds the rated value. The capacitors include a first capacitor coupled to the first phase line and the second phase line, a second capacitor coupled to the second phase line and the third phase line, and a third capacitor coupled to the first phase line and the third phase line, and may minimize the amount by which the voltage between two phase lines falls below the rated value.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a schematic block diagram of a system constructed in accordance with at least one embodiment of the present invention for conditioning electric power supplied from a three-phase alternating current (AC) electric power supply to a load.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A system 10 constructed in accordance with various embodiments of the present invention for conditioning the electric power supplied to a load 12 from an alternating current (AC) electric power supply 14 is shown in FIG. 1. The electric power supply 14, in various embodiments, may be a three-phase electric power source and may represent the electric power supplied from a utility company, a generator, or similar source. The electric power supply 14 may present or provide a first phase line 16, a second phase line 18, and a third phase line 20, identified in FIG. 1 as Φ1, Φ2, and Φ3, respectively, wherein the angular difference of the voltage between any two phases is 120 degrees, as known to those skilled in the art. The load 12 may be any commonly implemented load that draws electric power such as motors, compressors, turbines, lighting, heating, combinations thereof, or other industrial, commercial, or residential loads. The load 12 may be balanced between the first phase line 16, the second phase line 18, and the third phase line 20, or the load 12 may be unbalanced. Furthermore, in various embodiments, the load 12 may include an electric ground line 22, identified in FIG. 1 as "GND".

The system 10 may broadly comprise a first set of surge arresters 24, a second set of surge arresters 26, a third set of surge arresters 28, a three-phase surge suppressor 30, and a plurality of capacitors 32. The system 10 is generally positioned between the electric power supply 14 and the load 12, and may be utilized with existing electric power supply 14 structures in an industrial, commercial, or residential setting. Or, the system 10 may be integrated into a new residence or other building. In embodiments for usage with a new electric power supply 14 structure, the components of the system 10 may be incorporated in an electric power distribution control panel. In other embodiments for usage with an existing residence or building, the system 10 may be enclosed in a housing or insulated box, typically in close proximity to the electric power delivery point, such as a wiring panel, for a facility, building, or residence. The housing may be designed to output four wires that couple with each of the phase lines 16, 18, 20 and the ground line 22 of the existing electric power wiring at the load 12.

In one embodiment, the first set surge arresters 24 may include two surge arresters 24a, 24b, as depicted in FIG. 1. The surge arresters 24a, 24b may include surge suppressors or lightning arresters or other devices that operate on the general principle of presenting an open circuit or high impedance between two ports when the voltage between the two ports is less than or equal to a given value and presenting a short circuit or low impedance between the two ports when the voltage therebetween exceeds the given value. In various embodiments, one of the ports may be coupled to one of the phase lines 16, 18, 20 and the other port may be coupled to the ground line 22. The surge arresters 24a, 24b may be generally passive elements and may include such components as metal-oxide varistors or the like.

In various embodiments, the surge arrester 24a may present a single phase, two-pole, three-wire configuration, and may include a first port 36a, a second port 36b, and a ground port 36c. An example of the surge arrester 24a may include the AG2401C from Intermatic of Spring Grove, Il. The two-pole surge arrester 24a may monitor the voltage between two set of ports independently—between the first port 36*a* and the ground port 36*c*, and between the second port 36*b* and the ground port 36*c*. Thus, the surge arrester 24*a* may present a low impedance between the first port 36*a* and the ground port 36*c* if the voltage therebetween exceeds a rated value. Likewise, the surge arrester 24*a* may present a low impedance between the second port 36*b* and the ground port 36*c* if the voltage therebetween exceeds a rated value. The surge arrester 24*a* may have an additional mode of operation, wherein the surge arrester 24*a* presents a low impedance from either or both of the first port 36*a* and the second port 36*b* to the ground port 36*c* when the voltage between the first port 36*a* and the second port 36*b* exceeds a rated value. The surge arrester 24*b* may be substantially similar to the surge arrester 24*a* and may include a first port 36*d*, a second port 36*e*, and a ground port 36*f*.

The surge arrester 24*a* may further include an electric current rating which corresponds to the rated amount of current that can be handled by the surge arrester 24*a*. Thus, the number of surge arresters 24*a*, 24*b*, etc. included in the plurality of first surge arresters 24 is related to the total amount of current the load 12 is expected to draw divided by the current rating of each surge arrester 24*a*, 24*b*. For example, if the total current drawn by the load 12 is 200 amperes (A) and each surge arrester 24*a*, 24*b* is rated for 40 A, then there may be 200 A/40 A=5 surge arresters 24*a*, 24*b*, etc. included in the plurality of first surge arresters 24. In some embodiments, it may be possible to include surge arresters 24*a*, 24*b* of different current ratings as long as the sum of the current ratings for all the surge arresters 24*a*, 24*b*, etc. is equal to or greater than the total current drawn by the load 12.

The surge arrester 24*a* may be oriented in the system 10 such that the first port 36*a* is coupled to the first phase line 16, the second port 36*b* is coupled to the second phase line 18, and the ground port 36*c* is coupled to the ground line 22. The surge arrester 24*b* may be oriented in the system 10 such that the first port 36*d* is coupled to the first phase line 16, the second port 36*e* is coupled to the second phase line 18, and the ground port 36*f* is coupled to the ground line 22.

The second set of surge arresters 26 may also include two surge arresters 26*a*, 26*b*, which may function substantially the same way as the surge arresters 24*a*, 24*b* described above. The surge arrester 26*a* may include a first port 38*a*, a second port 38*b*, and a ground port 38*c*. The surge arrester 26*b* may include a first port 38*d*, a second port 38*e*, and a ground port 38*f*. The surge arrester 26*a* may be oriented in the system 10 such that the first port 38*a* is coupled to the second phase line 18, the second port 38*b* is coupled to the third phase line 20, and the ground port 38*c* is coupled to the ground line 22. The surge arrester 26*b* may be oriented in the system 10 such that the first port 38*d* is coupled to the second phase line 18, the second port 38*e* is coupled to the third phase line 20, and the ground port 38*f* is coupled to the ground line 22.

The third set of surge arresters 28 may also include two surge arresters 28*a*, 28*b*, which may function substantially the same way as the surge arresters 24*a*, 24*b* described above. The surge arrester 28*a* may include a first port 40*a*, a second port 40*b*, and a ground port 40*c*. The surge arrester 28*b* may include a first port 40*d*, a second port 40*e*, and a ground port 40*f*. The surge arrester 28*a* may be oriented in the system 10 such that the first port 40*a* is coupled to the second phase line 18, the second port 40*b* is coupled to the third phase line 20, and the ground port 40*c* is coupled to the ground line 22. The surge arrester 28*b* may be oriented in the system 10 such that the first port 40*d* is coupled to the second phase line 18, the second port 40*e* is coupled to the third phase line 20, and the ground port 40*f* is coupled to the ground line 22.

The three-phase surge suppressor 30 may include surge suppressors, surge protectors, surge arresters, combinations thereof, and the like. The three-phase surge suppressor 30 may be a generally passive element and may include such components as metal-oxide varistors or the like. The three-phase surge suppressor 30 may include a first port 42, a second port 44, a third port 46, and a ground port 48. An example of the three-phase surge suppressor 30 includes the 120 Volt AC (VAC) transient voltage surge suppressor from Innovative Technology of Moon Township, Pa. In a similar fashion to the surge arrester 24 discussed above, the three-phase surge suppressor 30 may present a low impedance between the first port 42 and the ground port 48 if the voltage therebetween exceeds a rated value. Likewise, the three-phase surge suppressor 30 may present a low impedance between the second port 44 and the ground port 48 if the voltage therebetween exceeds a rated value, and may present a low impedance between the third port 46 and the ground port 48 if the voltage therebetween exceeds a rated value. The three-phase surge suppressor 30 may be oriented in the system 10 such that the first port 42 is coupled to the first phase line 16, the second port 44 is coupled to the second phase line 18, the third port 46 is coupled to the third phase line 20, and the ground port 48 is coupled to the ground line 22.

The plurality of capacitors 32 generally maintains the voltage level of any of the first phase line 16, the second phase line 18, or the third phase line 20 with respect to one another whenever the load 12 changes, such as whenever a load is added as may occur during the starting of an electric motor. The plurality of capacitors 32 may also serve to correct the power factor by reducing the reactive power consumed by highly inductive loads such as electric motors. The plurality of capacitors 32 may include many types of capacitors such as electrolytic or polypropylene dielectric capacitors.

The plurality of capacitors 32 may include at least a first capacitor 50, a second capacitor 52, and a third capacitor 54. In various embodiments, the three capacitors may be substantially similar. Further, the first capacitor 50, the second capacitor 52, and the third capacitor 54 may include one or more physical capacitors coupled in parallel. Examples of the first capacitor 50, the second capacitor 52, and the third capacitor 54 may include the HID 4446-P 280 VAC, 28 microfarad capacitor from Aerovox Corporation of New Bedford, Mass.

First capacitor 50 may include a first terminal 56*a* coupled to the first phase line 16 and a second terminal 56*b* coupled to the second phase line 18. Second capacitor 52 may include a first terminal 58*a* coupled to the second phase line 18 and a second terminal 58*b* coupled to the third phase line 20. Third capacitor 54 may include a first terminal 60*a* coupled to the third phase line 20 and a second terminal 60*b* coupled to the first phase line 16.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A system for conditioning electric power supplied from a three-phase alternating current (AC) electric power supply to a load, the power supply including a first phase line, a second phase line, and a third phase line, and the load including the first phase line, the second phase line, the third phase line, and an electric ground line, the system comprising:

a plurality of first surge arresters configured to minimize an amount by which a voltage between two phase lines and the ground line exceeds a rated value, each first surge arrester coupled to the first phase line from the AC electric power supply and to the load, the second phase line from the AC electric power supply and to the load, and the ground line to the load only, wherein each first surge arrester is not electrically connected to a neutral line;

a plurality of second surge arresters configured to minimize an amount by which the voltage between two phase lines and the ground line exceeds the rated value, each second surge arrester coupled to the second phase line from the AC electric power supply and to the load, the third phase line from the AC electric power supply and to the load, and the ground line to the load only, wherein each second surge arrester is not electrically connected to the neutral line;

a plurality of third surge arresters configured to minimize an amount by which the voltage between two phase lines and the ground line exceeds the rated value, each third surge arrester coupled to the first phase line from the AC electric power supply and to the load, the third phase line from the AC electric power supply and to the load, and the ground line to the load only, wherein each third surge arrester is not electrically connected to the neutral line;

a three phase surge suppressor configured to minimize an amount by which the voltage between any of the three phase lines and the ground line exceeds the rated value, the surge suppressor coupled to the first phase line from the AC electric power supply and to the load, the second phase line from the AC electric power supply and to the load, the third phase line from the AC electric power supply and to the load, and the ground line to the load only, wherein the three phase surge suppressor is not electrically connected to the neutral line; and a plurality of capacitors configured to minimize an amount by which the voltage between two phase lines falls below the rated value and including a first capacitor coupled to the first phase line and the second phase line, a second capacitor coupled to the second phase line and the third phase line, and a third capacitor coupled to the first phase line and the third phase line.

2. The system of claim 1, wherein each of the first surge arresters includes a first electric current rating, such that the number of first surge arresters is related to an electric current requirement of the load divided by the first electric current rating.

3. The system of claim 1, wherein each of the second surge arresters includes a second electric current rating, such that the number of second surge arresters is related to an electric current requirement of the load divided by the second electric current rating.

4. The system of claim 1, wherein each of the third surge arresters includes a third electric current rating, such that the number of third surge arresters is related to an electric current requirement of the load divided by the third electric current rating.

5. The system of claim 1, wherein the first surge arresters, the second surge arresters, the third surge arresters, and the three phase surge suppressor are passive.

6. The system of claim 1, wherein the first surge arresters present a low impedance to the ground line when either the first phase line or the second phase line exceeds the rated value.

7. The system of claim 1, wherein the second surge arresters present a low impedance to the ground line when either the second phase line or the third phase line exceeds the rated value.

8. The system of claim 1, wherein the third surge arresters present a low impedance to the ground line when either the third phase line or the first phase line exceeds the rated value.

9. The system of claim 1, wherein the three phase surge suppressor presents a low impedance to the ground line when any of the first phase line, the second phase line, or the third phase line exceeds the rated value.

10. A system for conditioning electric power supplied from a three-phase alternating current (AC) electric power supply to a load, the power supply including a first phase line, a second phase line, and a third phase line, and the load including the first phase line, the second phase line, the third phase line, and an electric ground line, the system comprising:
- a plurality of first surge arresters, each first surge arrester coupled to the first phase line from the AC electric power supply and to the load, the second phase line from the AC electric power supply and to the load, and the ground line to the load only, wherein each first surge arrester is not electrically connected to a neutral line, and each first surge arrester is configured to minimize the amount by which a voltage between two phase lines and the ground line exceeds a rated value by presenting a low impedance to the ground line when either the first phase line or the second phase line exceeds the rated value;
- a plurality of second surge arresters, each second surge arrester coupled to the second phase line from the AC electric power supply and to the load, the third phase line from the AC electric power supply and to the load, and the ground line to the load only, wherein each second surge arrester is not electrically connected to the neutral line, and each second surge arrester is configured to minimize an amount by which the voltage between two phase lines and the ground line exceeds a rated value by presenting the low impedance to the ground line when either the second phase line or the third phase line exceeds the rated value;
- a plurality of third surge arresters, each third surge arrester coupled to the first phase line from the AC electric power supply and to the load, the third phase line from the AC electric power supply and to the load, and the ground line to the load only, wherein each third surge arrester is not electrically connected to the neutral line, and each third surge arrester is configured to minimize an amount by which the voltage between two phase lines and the ground line exceeds a rated value by presenting the low impedance to the ground line when either the third phase line or the first phase line exceeds the rated value;
- a three phase surge suppressor coupled to the first phase line from the AC electric power supply and to the load, the second phase line from the AC electric power supply and to the load, the third phase line from the AC electric power supply and to the load, and the ground line to the load only, wherein each three phase surge suppressor is not electrically connected to the neutral line, and configured to minimize an amount by which the voltage between any of the three phase lines and the ground line exceeds a rated value by presenting the low impedance to the ground line when either the first phase line, the second phase line, or the third phase line exceeds the rated value; and
- a plurality of capacitors configured to minimize an amount by which the voltage between two phase lines falls below the rated value and including a first capacitor coupled to the first phase line and the second phase line, a second capacitor coupled to the second phase line and the third phase line, and a third capacitor coupled to the first phase line and the third phase line.

11. The system of claim 10, wherein each of the first surge arresters includes a first electric current rating, such that the number of first surge arresters is related to an electric current requirement of the load divided by the first electric current rating.

12. The system of claim 10, wherein each of the second surge arresters includes a second electric current rating, such that the number of second surge arresters is related to an electric current requirement of the load divided by the second electric current rating.

13. The system of claim 10, wherein each of the third surge arresters includes a third electric current rating, such that the number of third surge arresters is related to an electric current requirement of the load divided by the third electric current rating.

14. The system of claim 10, wherein the first surge arresters, the second surge arresters, the third surge arresters, and the three phase surge suppressor are passive.

15. A system for conditioning electric power supplied from a three-phase alternating current (AC) electric power supply to a load, the power supply including a first phase line, a second phase line, and a third phase line, and the load including the first phase line, the second phase line, the third phase line, and an electric ground line, the system comprising:
- a plurality of first surge arresters, each first surge arrester coupled to the first phase line from the AC electric power supply and to the load, the second phase line from the AC electric power supply and to the load, and the ground line to the load only, wherein each first surge arrester is not electrically connected to a neutral line, and each first surge arrester is configured to minimize the amount by which a voltage between two phase lines and the ground line exceeds a rated value by presenting a low impedance to the ground line when either the first phase line or the second phase line exceeds the rated value, each of the first surge arresters including a first electric current rating, such that the number of first surge arresters is related to an electric current requirement of the load divided by the first electric current rating;
- a plurality of second surge arresters, each second surge arrester coupled to the second phase line from the AC electric power supply and to the load, the third phase line from the AC electric power supply and to the load, and the ground line to the load only, wherein each second surge arrester is not electrically connected to the neutral line, and each second surge arrester is configured to minimize an amount by which the voltage between two phase lines and the ground line exceeds a rated value by presenting the low impedance to the ground line when either the second phase line or the third phase line exceeds the rated value, each of the second surge arresters including a second electric current rating, such that the number of second surge arresters is related to the electric current requirement of the load divided by the second electric current rating;

a plurality of third surge arresters, each third surge arrester coupled to the first phase line from the AC electric power supply and to the load, the third phase line from the AC electric power supply and to the load, and the ground line to the load only, wherein each third surge arrester is not electrically connected to the neutral line, and each third surge arrester is configured to minimize an amount by which the voltage between two phase lines and the ground line exceeds a rated value by presenting the low impedance to the ground line when either the third phase line or the first phase line exceeds the rated value, each of the third surge arresters including a third electric current rating, such that the number of third surge arresters is related to the electric current requirement of the load divided by the third electric current rating;

a three phase surge suppressor coupled to the first phase line from the AC electric power supply and to the load, the second phase line from the AC electric power supply and to the load, the third phase line from the AC electric power supply and to the load, and the ground line to the load only, wherein each three phase surge suppressor is not electrically connected to the neutral line, and configured to minimize an amount by which the voltage between any of the three phase lines and the ground line exceeds a rated value by presenting the low impedance to the ground line when either the first phase line, the second phase line, or the third phase line exceeds the rated value; and a plurality of capacitors configured to minimize an amount by which the voltage between two phase lines falls below the rated value and including a first capacitor coupled to the first phase line and the second phase line, a second capacitor coupled to the second phase line and the third phase line, and a third capacitor coupled to the first phase line and the third phase line.

* * * * *